(12) United States Patent
Kim

(10) Patent No.: US 12,137,077 B2
(45) Date of Patent: Nov. 5, 2024

(54) METHOD AND DEVICE FOR ARP OPERATION IN COMMUNICATION SYSTEM SUPPORTING MULTIPLE LINKS

(71) Applicants: HYUNDAI MOTOR COMPANY, Seoul (KR); KIA CORPORATION, Seoul (KR); KOREA NATIONAL UNIVERSITY OF TRANSPORTATION INDUSTRY-ACADEMIC COOPERATION FOUNDATION, Chungju-si (KR)

(72) Inventor: Yong Ho Kim, Incheon (KR)

(73) Assignees: HYUNDAI MOTOR COMPANY, Seoul (KR); KIA CORPORATION, Seoul (KR); KOREA NATIONAL UNIVERSITY OF TRANSPORTATION INDUSTRY—ACADEMIC COOPERATION FOUNDATION, Chungju-si (KR)

( * ) Notice: Subject to any disclaimer, the term of this patent is extended or adjusted under 35 U.S.C. 154(b) by 0 days.

(21) Appl. No.: 18/036,693

(22) PCT Filed: Nov. 10, 2021

(86) PCT No.: PCT/KR2021/016359
§ 371 (c)(1),
(2) Date: May 12, 2023

(87) PCT Pub. No.: WO2022/103155
PCT Pub. Date: May 19, 2022

(65) Prior Publication Data
US 2023/0412557 A1 Dec. 21, 2023

(30) Foreign Application Priority Data

Nov. 13, 2020 (KR) .................. 10-2020-0152082
Nov. 10, 2021 (KR) .................. 10-2021-0154003

(51) Int. Cl.
*H04L 61/255* (2022.01)
*H04L 61/103* (2022.01)
*H04L 101/622* (2022.01)

(52) U.S. Cl.
CPC .......... *H04L 61/103* (2013.01); *H04L 61/255* (2013.01); *H04L 2101/622* (2022.05)

(58) Field of Classification Search
CPC H04L 61/103; H04L 61/255; H04L 2101/622
(Continued)

(56) References Cited

U.S. PATENT DOCUMENTS 7,382,778 B2 6/2008 Chari et al.
7,596,693 B1 9/2009 Caves et al.
(Continued)

FOREIGN PATENT DOCUMENTS

KR 101088868 B1 12/2011
KR 101710385 B1 2/2017

OTHER PUBLICATIONS

International Search Report and Written Opinion cited in corresponding international application No. PCT/KR2021/016359; Feb. 15, 2022; 8pp.

*Primary Examiner* — Karen C Tang
(74) *Attorney, Agent, or Firm* — Lempia Summerfield Katz LLC

(57) ABSTRACT

A method and a device are disclosed for address resolution protocol (ARP) operation in a communication system supporting multiple links. An operation method of a first device comprises the steps of: receiving, from a communication node, an ARP request packet requesting the transmission of (Continued)

a MAC address of a second device connected to the first device; finding, in an ARP table stored in the first device, a representative MAC address of the second device requested by the ARP request packet; and transmitting an ARP response packet including the representative MAC address to the communication node.

16 Claims, 10 Drawing Sheets

(58) Field of Classification Search
USPC .................................... 709/224, 245
See application file for complete search history.

(56) References Cited

U.S. PATENT DOCUMENTS

| | | | |
|---|---|---|---|
| 11,805,470 B2* | 10/2023 | Kwon | H04W 76/11 |
| 2014/0079055 A1 | 3/2014 | Short et al. | |
| 2020/0244569 A1* | 7/2020 | Gao | H04L 45/245 |
| 2021/0014911 A1* | 1/2021 | Patil | H04W 72/0446 |
| 2021/0314292 A1* | 10/2021 | Seok | H04W 76/15 |
| 2022/0110053 A1* | 4/2022 | Chu | H04W 52/0216 |
| 2023/0036941 A1* | 2/2023 | Kim | H04W 52/0216 |
| 2023/0308938 A1* | 9/2023 | Sun | H04W 76/20 |
| | | | 370/230 |
| 2023/0328774 A1* | 10/2023 | Jang | H04W 74/04 |
| | | | 370/329 |

\* cited by examiner

FIG. 5A

| octets: | 2 | 2 | 6 | 0 or 6 | 0 or 2 | 0 or 6 | 0 or 2 | 0 or 2 | 0 or 2 | variable | 4 |
|---|---|---|---|---|---|---|---|---|---|---|---|
| | frame control | duration /ID | address 1 | address 2 | address 3 | sequence control | address 4 | QoS control | HT control | payload | FCS |

| octet offset | 0 | 1 |
|---|---|---|
| 0 | hardware type (HYTPE) (Ethernet: 1) | |
| 2 | protocol type (PTYPE) (IPv4: 0x0800) | |
| 4 | hardware address length (HLEN) (Ethernet: 6) | protocol address length (PLEN) (IPv4: 4) |
| 6 | operation (OPER) (request: 1, response: 2) | |
| 8 | sender hardware address (SHA) | |
| 10 | sender hardware address (SHA) | |
| 12 | sender hardware address (SHA) | |
| 14 | sender protocol address (SPA) | |
| 16 | sender protocol address (SPA) | |
| 18 | target hardware address (THA) | |
| 20 | target hardware address (THA) | |
| 22 | target hardware address (THA) | |
| 24 | target protocol address (TPA) | |
| 26 | target protocol address (TPA) | |

FIG. 5B

| preamble | start of frame delimiter | MAC destination | MAC source | 802.1Q tag (optional) | Ethernet type (Ethernet II) or length (IEEE 802.3) | payload | frame check sequence (32-bit CRC) | inter-packet gap |
|---|---|---|---|---|---|---|---|---|
| 7octets | 1octet | 6 octets | 6 octets | (4octets) | 2octets | 46-1500 octets | 4octets | 12octets |

STA MLD1 MAC address

METHOD AND DEVICE FOR ARP OPERATION IN COMMUNICATION SYSTEM SUPPORTING MULTIPLE LINKS

CROSS-REFERENCE TO RELATED APPLICATIONS

This application is a U.S. national stage of International Application No. PCT/KR2021/016359, filed on Nov. 10, 2021, which claims priority to Korean Patent Application No. 10-2020-0152082 filed on Nov. 13, 2020 and Korean Patent Application No. 10-2021-0154003 filed on Nov. 10, 2021, the entire disclosures of each of which are incorporated herein by reference.

TECHNICAL FIELD

The present disclosure relates to a wireless local area network (LAN) communication technique, and more particularly, to a technique for transmitting and receiving Internet protocol (IP) packets based on a proxy address resolution protocol (ARP) in a communication system supporting multiple links.

BACKGROUND

Recently, as the spread of mobile devices expands, a wireless local area network (LAN) technology capable of providing fast wireless communication services to mobile devices is in the spotlight. The wireless LAN technology may be a technology that supports mobile devices, such as smart phones, smart pads, laptop computers, portable multimedia players, embedded devices, and the like, to wirelessly access the Internet based on wireless communication technology.

The standards using the wireless LAN technology are being standardized as IEEE802.11 standards mainly in the Institute of Electrical and Electronics Engineers (IEEE). As the above-described wireless LAN technologies have been developed and spread, applications using the wireless LAN technologies have been diversified, and a demand for a wireless LAN technology supporting a higher throughput has arisen. Accordingly, a frequency bandwidth (e.g., 'maximum 160 MHz bandwidth' or '80+80 MHz bandwidth') used in the IEEE 802.1 lac standard has been expanded, and the number of supported spatial streams has also increased. The IEEE 802.11ac standard may be a very high throughput (VHT) wireless LAN technology supporting a high throughput of 1 gigabit per second (Gbps) or more. The IEEE 802.11ac standard can support downlink transmission for multiple stations by utilizing the MIMO techniques.

As applications requiring higher throughput and applications requiring real-time transmission occur, the IEEE 802.11be standard, which is an extreme high throughput (EHT) wireless LAN technology, is being developed. The goal of the IEEE 802.11be standard may be to support a high throughput of 30 Gbps. The IEEE 802.11be standard may support techniques for reducing a transmission latency. In addition, the IEEE 802.11be standard can support a more expanded frequency bandwidth (e.g., 320 MHz bandwidth), multi-link transmission and aggregation operations including multi-band operations, multiple access point (AP) transmission operations, and/or efficient retransmission operations (e.g., hybrid automatic repeat request (HARQ) operations).

However, since multi-link operations are operations not defined in the existing wireless LAN standard, it may be necessary to define detailed operations according to an environment in which the multi-link operations are performed. In particular, methods for supporting low-power operations in the multi-link environment may be required.

Meanwhile, the technologies that are the background of the present disclosure are written to improve the understanding of the background of the present disclosure and may include content that is not already known to those of ordinary skill in the art to which the present disclosure belongs.

SUMMARY

The present disclosure is directed to providing a method and an apparatus for a proxy address resolution protocol (ARP) operation in a communication system supporting multiple links.

Technical Solution

An operation method of a first device, according to a first embodiment of the present disclosure for achieving the above-described objective, may comprise receiving, from a communication node, an address resolution protocol (ARP) request packet requesting transmission of a medium access control (MAC) address of a second device associated with the first device. The operation method may also comprise identifying a representative MAC address of the second device, which is requested by the ARP request packet, from an ARP table stored in the first device. The operation method may also comprise transmitting, to the communication node, an ARP response packet including the representative MAC address.

The first device may be an access point (AP) multi-link device (MLD). The second device may be a station (STA) MLD. The STA MLD may include a STA1 and a STA2. A first MAC address of the STA MLD, a second MAC address of the STA1, and a third MAC address of the STA2 may be configured independently of each other. The representative MAC address may be the first MAC address.

The ARP request packet may include an indicator requesting provision of the representative MAC address.

The operation method may further comprise receiving a data frame from the communication node. The operation method may further comprise in response to that a receiver address of the data frame is set to the representative MAC address of the second device, generating a first physical layer convergence protocol (PLCP) protocol data unit (PPDU) and a second PPDU based on data included in the data frame. The operation method may further comprise transmitting the first PPDU to a STA1 included in the second device. The operation method may further comprise transmitting the second PPDU to a STA2 included in the second device.

The operation method may further comprise determining a traffic identifier (TID) based on a type of the data and identifying a first link and a second link mapped to the TID among multiple links. The first PPDU is transmitted to the STA1 through the first link, and the second PPDU is transmitted to the STA2 through the second link.

A size of a first data unit included in the first PPDU may be equal to a size of a second data unit included in the second PPDU, and the first data unit and the second data unit may be generated based on the data.

The first PPDU may include a first data unit generated based on the data, the second PPDU may include a second data unit generated based on the data, and a size of the first data unit and a size of the second data unit may be determined based on link occupancy states.

The ARP request packet may include an Internet protocol (IP) address of the second device, the ARP request packet may not be transmitted to the second device, and the ARP response packet may be transmitted by the first device on behalf of the second device.

The ARP table may include an IP address and a MAC address of the second device associated with the first device and a MAC address of each of one or more STAs included in the second device.

The ARP table may be generated based on information included in messages transmitted and received in an IP address acquisition procedure performed by the second device.

The first device may be an AP MLD, the second device may be a STA MLD, and the first device may be associated with the second device through multiple links.

A first device, according to a second embodiment of the present disclosure for achieving the above-described objective, may comprise: a processor and a memory storing one or more instructions executable by the processor. The one or more instructions are executed to perform receiving, from a communication node, an address resolution protocol (ARP) request packet requesting transmission of a medium access control (MAC) address of a station 1 (STA1) included in a second device associated with the first device. The one or more instructions are also executed to perform identifying a MAC address of the STA1, which is requested by the ARP request packet, from an ARP table stored in the first device. The one or more instructions are also executed to perform transmitting, to the communication node, an ARP response packet including the MAC address of the STA1.

The ARP request packet may include an Internet protocol (IP) address of the STA1, the ARP request packet may not be transmitted to the second device or the STA1, and the ARP response packet may be transmitted by the first device on behalf of the second device or the STA1.

The second device may include one or more STAs, and an IP address of each of the second device and the one or more STAs may be configured independently.

The ARP table may include an IP address and a MAC address of the second device associated with the first device and an IP address and a MAC address of each of one or more STAs included in the second device.

The ARP table may be generated based on information included in messages transmitted and received in an IP address acquisition procedure performed by each of the second device and the one or more STAs.

The one or more instructions may be further executed to perform receiving a data frame from the communication node. The one or more instructions may be further executed to perform in response to that a receiver address of the data frame is set to the MAC address of the STA1 included in the second device, generating a first physical layer convergence protocol (PLCP) protocol data unit (PPDU) based on data included in the data frame. The one or more instructions may be further executed to perform transmitting the first PPDU to the second device. An address 1 field included in the first PPDU is set to a MAC address of the STA MLD, an address 2 field included in the first PPDU is set to a MAC address of the AP MLD, an address field 3 included in the first PPDU is set to the MAC address of the STA1, and an address 4 field included in the first PPDU is set to a MAC address of the communication node.

According to the present disclosure, an access point (AP) multi-link device (MLD) may store an address resolution protocol (ARP) table including an Internet protocol (IP) address and a medium access control (MAC) address of a station (STA) MLD and transmit an ARP response packet based on the ARP table on behalf of the STA MLD. Accordingly, unnecessary ARP operations by communication nodes other than the AP MLD can be prevented, radio resources can be efficiently used, and ARP operations can be performed quickly.

BRIEF DESCRIPTION OF DRAWINGS

FIG. 5A is a block diagram illustrating a first embodiment of a format of an ARP packet.

FIG. 5B is a block diagram illustrating a first embodiment of an Ethernet frame.

DETAILED DESCRIPTION

Figure 1:
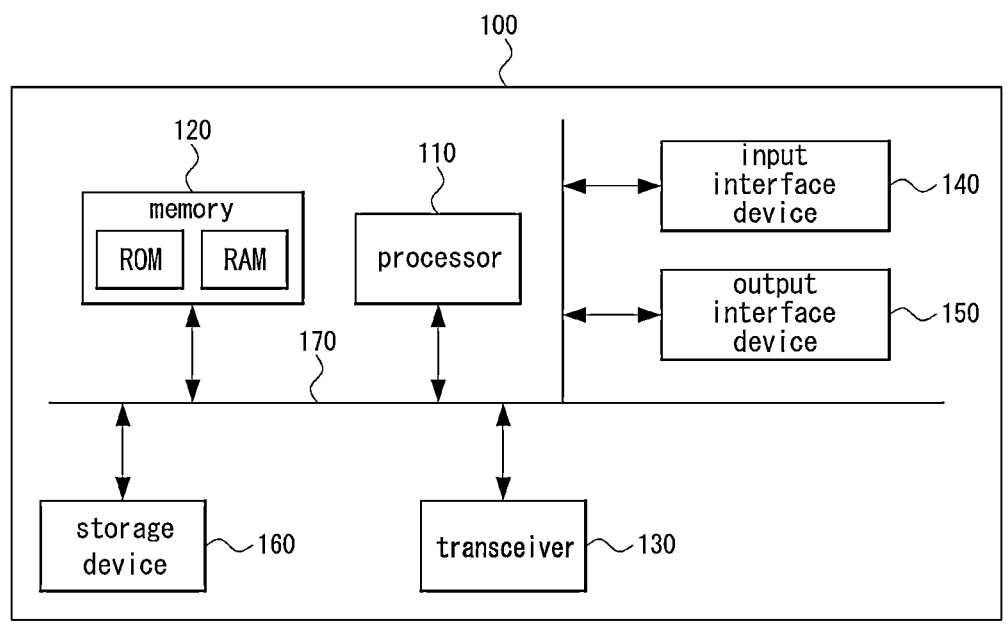
FIG. 1 is a block diagram illustrating a first embodiment of a communication node constituting a wireless local area network (LAN) system.

Since the present disclosure may be variously modified and have several forms, specific embodiments are shown in the accompanying drawings and are described in the detailed description. It should be understood, however, that it is not intended to limit the present disclosure to the specific embodiments but. On the contrary, the present disclosure is intended to cover all modifications and alternatives falling within the spirit and scope of the present disclosure.

Relational terms, such as first, second, and the like, may be used for describing various elements, but the elements should not be limited by the terms. These terms are only used to distinguish one element from another. For example, a first component may be named as a second component without departing from the scope of the present disclosure, and the second component may also be similarly named as the first component. The term "and/or" means any one or a combination of a plurality of related and described items.

In embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it should be understood that a further component is not disposed therebetween.

The terms used in the present disclosure are only used to describe specific embodiments and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists. However, it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings consistent with contextual meanings in the art. In this description, unless defined clearly, terms are not necessarily construed as having formal meanings.

Hereinafter, forms of the present disclosure are described in detail with reference to the accompanying drawings. In describing the disclosure, to facilitate the entire understanding of the disclosure, like numbers refer to like elements throughout the description of the figures and the repetitive description thereof has been omitted.

In the following, a wireless communication system to which embodiments according to the present disclosure are applied is described. The wireless communication system to which the embodiments according to the present disclosure are applied is not limited to the contents described below, and the embodiments according to the present disclosure can be applied to various wireless communication systems. A wireless communication system may be referred to as a 'wireless communication network'.

FIG. 1 is a block diagram illustrating a first embodiment of a communication node constituting a wireless local area network (LAN) system.

As shown in FIG. 1, a communication node 100 may be an access point, a station, an access point (AP) multi-link device (MLD), or a non-AP MLD. The access point may refer to an AP, and the station may refer to a STA or a non-AP STA. The operating channel width supported by the access point may be 20 megahertz (MHz), 80 MHz, 160 MHz, or the like. The operating channel width supported by the station may be 20 MHz, 80 MHz, or the like.

The communication node 100 may include at least one processor 110, a memory 120, and a plurality of transceivers 130 connected to a network to perform communications. The transceiver 130 may be referred to as a transceiver, a radio frequency (RF) unit, an RF module, or the like. In addition, the communication node 100 may further include an input interface device 140, an output interface device 150, a storage device 160, and the like. The components included in the communication node 100 may be connected by a bus 170 to communicate with each other.

However, the respective components included in the communication node 100 may be connected through individual interfaces or individual buses centering on the processor 110 instead of the common bus 170. For example, the processor 110 may be connected to at least one of the memory 120, the transceiver 130, the input interface device 140, the output interface device 150, or the storage device 160 through a dedicated interface.

The processor 110 may execute at least one instruction stored in at least one of the memory 120 or the storage device 160. The processor 110 may refer to a central processing unit (CPU), a graphics processing unit (GPU), or a dedicated processor on which the methods according to the embodiments of the present disclosure are performed. Each of the memory 120 and the storage device 160 may be configured as at least one of a volatile storage medium or a nonvolatile storage medium. For example, the memory 120 may be configured with at least one of a read only memory (ROM) or a random access memory (RAM).

Figure 2:
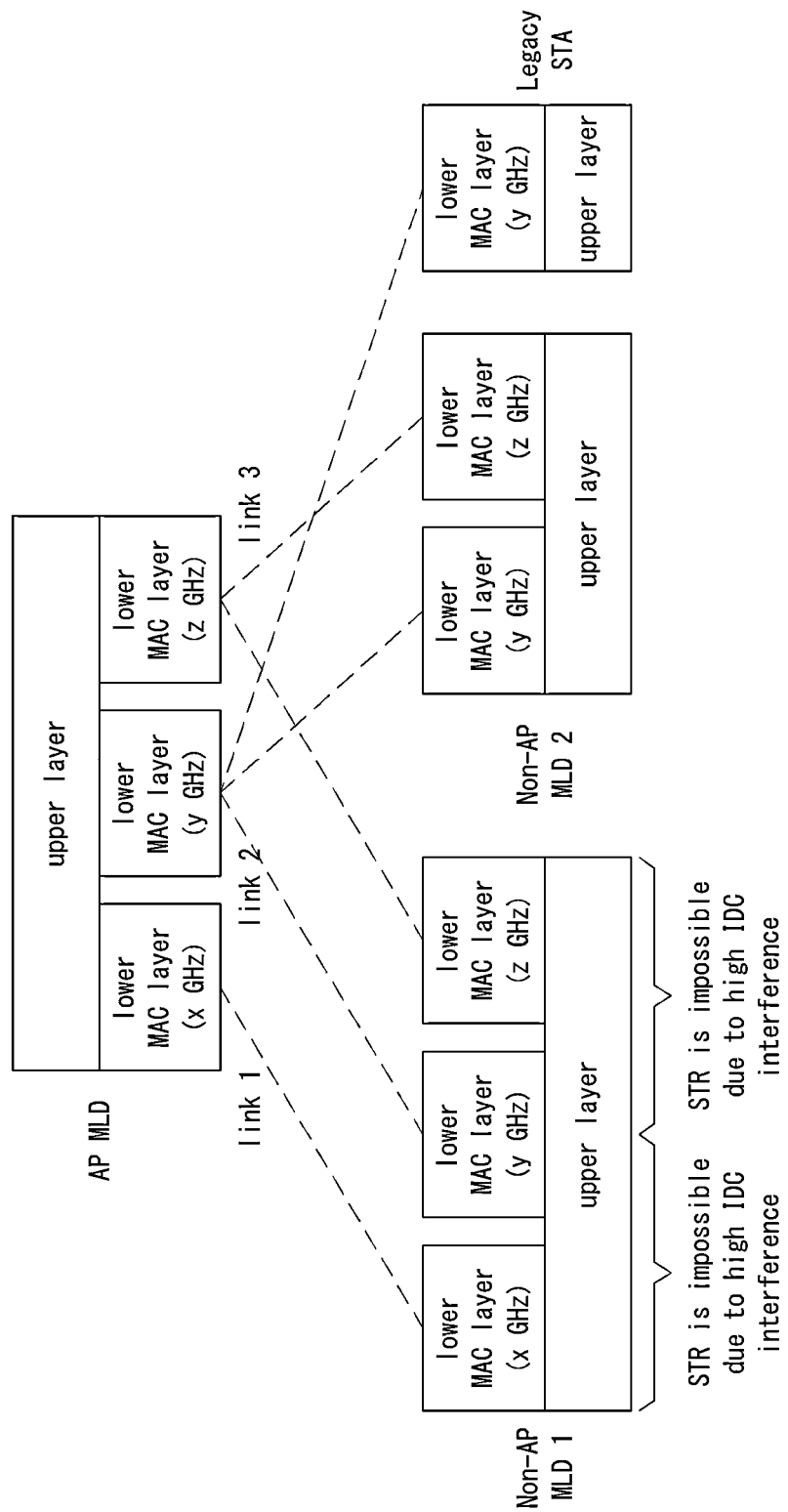
FIG. 2 is a conceptual diagram illustrating a first embodiment of multi-links configured between multi-link devices (MLDs).

FIG. 2 is a conceptual diagram illustrating a first embodiment of multi-links configured between MLDs.

As shown in FIG. 2, an MLD may have one medium access control (MAC) address. In embodiments, the MLD may mean an AP MLD and/or a non-AP MLD. The MAC address of the MLD may be used in a multi-link setup procedure between the non-AP MLD and the AP MLD. The MAC address of the AP MLD may be different from the MAC address of the non-AP MLD. AP(s) affiliated with the AP MLD may have different MAC addresses, and station(s) (STA(s)) affiliated with the non-AP MLD may have different MAC addresses. Each of the APs having different MAC addresses may be in charge of each link and may perform a role of an independent AP.

Each of the STAs having different MAC addresses may be in charge of each link and may perform a role of an independent STA. The non-AP MLD may be referred to as a STA MLD. The MLD may support simultaneous transmit and receive (STR) operations. In this case, the MLD may perform a transmission operation on a link 1 and may perform a reception operation on a link 2. The MLD supporting the STR operations may be referred to as an STR MLD (e.g., STR AP MLD, STR non-AP MLD). In embodiments, a link may refer to a channel or band. A device that does not support the STR operations may be referred to as a non-simultaneous transmit and receive (NSTR) AP MLD or an NSTR non-AP MLD (or NSTR STA MLD).

A multi-link operation may include multi-band transmission. The AP MLD may include a plurality of access points, and the plurality of access points may operate on different links. Each of the plurality of access points may perform function(s) of a lower MAC layer. Each of the plurality of access points may be referred to as a 'communication node' or 'lower entity'. The communication node (i.e., access point) may operate under controls of an upper layer (or the processor 110 shown in FIG. 1). The non-AP MLD may include a plurality of stations, and the plurality of stations may operate on different links. Each of the plurality of stations may be referred to as a 'communication node' or 'lower entity'. The communication node (i.e., station) may operate under controls of an upper layer (or the processor 110 shown in FIG. 1).

The MLD may perform communication in a multi-band. One frequency band (e.g., one channel) used by the MLD may be defined as one link. Alternatively, a plurality of links may be configured in one frequency band used by the MLD. For example, the MLD may configure one link in the 2.4 GHz band and two links in the 6 GHz band. The respective links may be referred to as a first link, a second link, and a third link. Alternatively, the respective links may be referred to as a link 1, a link 2, and a link 3. A link number may be set by the AP, and an identifier (ID) may be assigned to each link.

The MLD (e.g., AP MLD and/or non-AP MLD) may configure a multi-link by performing an access procedure and/or a negotiation procedure for a multi-link operation. In this case, the number of links and/or link(s) to be used in the multi-link may be configured. The non-AP MLD (e.g., station) may identify information on band(s) capable of communicating with the AP MLD. In the negotiation procedure for a multi-link operation between the non-AP MLD and the AP MLD, the non-AP MLD may configure one or more links among links supported by the AP MLD to be used for the multi-link operation. A station that does not support a multi-link operation (e.g., IEEE 802.11a/b/g/n/ac/ax STA) may access one or more links of the multi-link supported by the AP MLD.

Each of the AP MLD and the STA MLD may have an MLD MAC address, and each AP and STA operating on each link may have a MAC address. The MLD MAC address of the AP MLD may be referred to as an 'AP MLD MAC address' or 'AP MLD address', and the MLD MAC address of the STA MLD may be referred to as a 'STA MLD MAC address' or 'non-AP MLD address'. The MAC address of the AP may be referred to as an 'AP MAC address' or 'AP address', and the MAC address of the STA may be referred to as a 'STA MAC address' or 'non-AP STA address'. In embodiments, the AP MLD MAC address may refer to the AP MLD address, the STA MLD MAC address may refer to the non-AP MLD address, the AP MAC address may refer to the AP address, and the STA MAC address may refer to the non-AP STA address. In a multi-link negotiation procedure, the AP MLD MAC address and the STA MLD MAC address may be used. The AP address and the STA address may be exchanged and/or configured in the multi-link negotiation procedure.

When the multi-link negotiation procedure is completed, the AP MLD may generate an address table and may manage and/or update the address table. One AP MLD MAC address may be mapped to one or more AP MAC addresses, and mapping information corresponding thereto may be included in the address table. One STA MLD MAC address may be mapped to one or more STA MAC addresses, and mapping information corresponding thereto may be included in the address table. The AP MLD may identify address information based on the address table. For example, when the STA MLD MAC address is received, the AP MLD may identify one or more STA MAC addresses mapped to the STA MLD MAC address based on the address table.

In addition, the STA MLD may manage and/or update the address table. The address table may include 'mapping information between the AP MLD MAC address and the AP MAC address(es)' and/or 'mapping information between the STA MLD MAC address and the STA MAC address(es)'. The AP MLD may receive a packet from the network, identify the address of the STA MLD included in the packet, identify link(s) supported by the STA MLD, and identify STA(s) in charge of the link(s) from the address table. The AP MLD may configure the STA MAC address(es) of the identified STA(s) as receiver address(es) and may generate and transmit frame(s) including the receiver address(es).

Meanwhile, in a wireless LAN system, a negotiation procedure for a multi-link operation (e.g., multi-link negotiation procedure) may be performed in an access procedure between a STA and an AP.

A device (e.g., AP or STA) supporting a multi-link may be referred to as a multi-link device (MLD). An AP supporting a multi-link may be referred to as an AP MLD, and a STA supporting a multi-link may be referred to as a non-AP MLD or STA MLD. The AP MLD may have a physical address (e.g., MAC address) for each link. The AP MLD may be implemented as if an AP in charge of each link exists separately. A plurality of APs may be managed within one AP MLD. Accordingly, coordination between the plurality of APs belonging to the same AP MLD may be possible. The STA MLD may have a physical address (e.g., MAC address) for each link. The STA MLD may be implemented as if an STA in charge of each link exists separately. A plurality of STAs may be managed within one STA MLD. Accordingly, coordination between the plurality of STAs belonging to the same STA MLD may be possible.

For example, an AP1 of the AP MLD and a STA1 of the STA MLD may each be in charge of a first link and may communicate using the first link. An AP2 of the AP MLD and a STA2 of the STA MLD may each be in charge of a second link and may communicate using the second link. The STA2 may receive state change information for the first link in the second link. In this case, the STA MLD may collect information (e.g., state change information) received from each link and may control operations performed by the STA1 based on the collected information.

Figure 3:
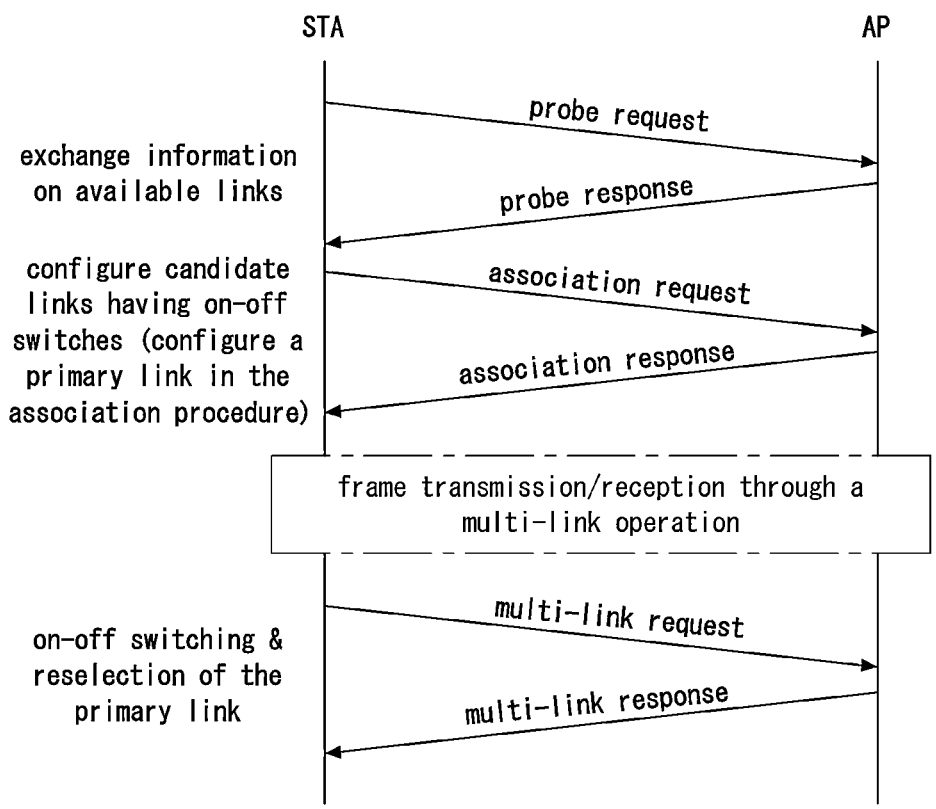
FIG. 3 is a sequence chart illustrating a first embodiment of a negotiation procedure for a multi-link operation in a wireless LAN system.

FIG. 3 is a sequence chart illustrating a first embodiment of a negotiation procedure for a multi-link operation in a wireless LAN system.

As shown in FIG. 3 an access procedure between an STA and an AP in an infrastructure basic service set (BSS) may generally be divided into a probe step of probing AP(s), an authentication step for authentication between the STA and the probed AP, and an association step of association between the STA and the authenticated AP.

In the probe step, the STA may detect one or more APs using a passive scanning scheme or an active scanning scheme. When the passive scanning scheme is used, the STA may detect one or more APs by overhearing beacons transmitted by the one or more APs. When the active scanning scheme is used, the STA may transmit a probe request frame and may detect one or more APs by receiving probe response frames that are responses to the probe request frame from the one or more APs.

When the one or more APs are detected, the STA may perform an authentication step with the detected AP(s). In this case, the STA may perform the authentication step with a plurality of APs. An authentication algorithm according to the IEEE 802.11 standard may be classified into an open system algorithm of exchanging two authentication frames, a shared key algorithm of exchanging four authentication frames, and the like.

The STA may transmit an authentication request frame based on the authentication algorithm according to the IEEE 802.11 standard and may complete authentication with the AP by receiving an authentication response frame that is a response to the authentication request frame from the AP.

When the authentication with the AP is completed, the STA may perform an association step with the AP. In particular, the STA may select one AP among AP(s) with which the STA has performed the authentication step, and the STA may perform the association step with the selected AP. In other words, the STA may transmit an association request frame to the selected AP and may complete the association with the AP by receiving an association response frame that is a response to the association request frame from the selected AP.

Meanwhile, a multi-link operation may be supported in the wireless LAN system. A multi-link device (MLD) may include one or more STAs affiliated with the MLD. The MLD may be a logical entity. The MLD may be classified into an AP MLD and a non-AP MLD. Each STA affiliated with the AP MLD may be an AP, and each STA affiliated with the non-AP MLD may be a non-AP STA. In order to configure a multi-link, a multi-link discovery procedure, a multi-link setup procedure, and the like may be performed. The multi-link discovery procedure may be performed in the probe step between an STA and an AP. In this case, multi-link information elements (ML IEs) may be included in the beacon frame, the probe request frame, and/or the probe response frame.

For example, in order to perform a multi-link operation, in the probe step, the AP (e.g., AP affiliated with an MLD) may exchange information indicating whether the multi-link operation can be used and information on available link(s) with the STA (e.g., non-AP STA affiliated with an MLD). In a negotiation procedure for the multi-link operation (e.g., multi-link setup procedure), the STA may transmit information of link(s) to be used for the multi-link operation. The negotiation procedure for the multi-link operation may be performed in the access procedure (e.g., association step) between the STA and the AP, and information element(s) required for the multi-link operation may be configured or changed by an action frame in the negotiation procedure.

In addition, in the access procedure (e.g., association step) between the STA and the AP, available link(s) of the AP may be configured, and an identifier (ID) may be assigned to each link. Thereafter, in the negotiation procedure and/or change procedure for the multi-link operation, information indicating whether each link is activated may be transmitted, and the information may be expressed using the link ID(s).

The information indicating whether the multi-link operation can be used may be transmitted and received in a procedure of exchanging capability information element(s) (e.g., EHT capability information element(s)) between the STA and the AP. The capability information element(s) may include information of supporting band(s), information of supporting link(s) (e.g., ID(s) and/or number of supporting link(s)), information of links capable of simultaneous transmission and reception (STR) operations (e.g., information on bands of the links, information on a separation between the links), and/or the like. In addition, the capability information element(s) may include information that individually indicates a link capable of the STR operation.

Figure 4:
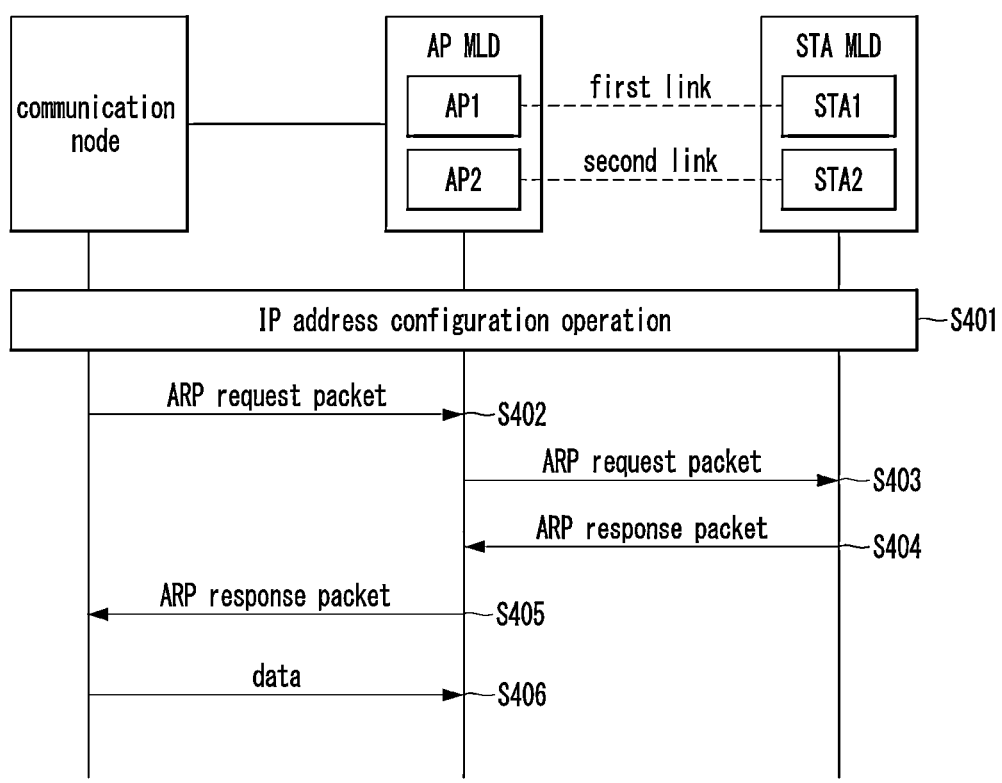
FIG. 4 is a sequence chart illustrating a first embodiment of a method for transmitting and receiving data according to an address resolution protocol (ARP) operation in a wireless LAN system.

FIG. 4 is a sequence chart illustrating a first embodiment of a method for transmitting and receiving data according to an address resolution protocol (ARP) operation in a wireless LAN system.

As shown in FIG. 4, communication (e.g., Internet protocol (IP) communication) using a multi-link may be performed between an AP MLD, which is a first MLD, and a non-AP MLD (e.g., STA MLD), which is a second MLD. In order to perform the IP communication, an IP address of the AP MLD and an IP address of the STA MLD may be configured. Each of the AP MLD and STA MLD may support two links (e.g., a first link and a second link). An AP1 included in the AP MLD may be in charge of the first link, and an AP2 included in the AP MLD may be in charge of the second link. A STA1 included in the STA MLD may be in charge of the first link, and a STA2 included in the STA MLD may be in charge of the second link. When an association procedure between the AP MLD and the STA MLD is completed (e.g., when the AP MLD and the STA MLD is in a communicable state), the AP MLD and/or STA MLD may use one link of the multi-link to acquire the IP address required for the IP communication (S401). The operation of acquiring the IP address may be performed using a dynamic host configuration protocol (DHCP). Performing a DHCP procedure by using the first link may mean that the STA1 performs the DHCP procedure through the AP1.

In the DHCP procedure, the STA1 may transmit a DHCP discovery message (e.g., DHCP discovery packet) to a DHCP server (e.g., communication node) located in the network. Address fields included in a MAC frame header of the DHCP discovery message may be set to [Transmitter address: MAC address of STA1, Receiver address: FF:FF:FF:FF:FF:FF]. The MAC address of the STA1 may be a STA MAC address. The transmitter address may be a source address, and the receiver address may be a destination address. 'FF:FF:FF:FF:FF:FF' may be a broadcast address. Address fields included in a DHCP IP packet may be set to [Source IP: 0.0.0.0, Destination IP: 255.255.255.255, Client address: MAC address of STA MLD]. The MAC address of the STA MLD may be the STA MLD MAC address. '255.255.255.255' may be a broadcast address. Alternatively, the client address may be set to the MAC address of the STA1 (e.g., the MAC address of the STA1 supporting the first link on which the DHCP procedure is performed).

The DHCP server may receive the DHCP discovery message, generate a DHCP offer message (e.g., DHCP offer packet) based on the DHCP discovery message, and transmit the DHCP offer message to the STA1 through the AP1. The AP1 may receive the DHCP offer message from the DHCP server and transmit the DHCP offer message to the STA1. Address fields included in a MAC frame header of the DHCP offer message may be set to [Transmitter address: MAC address of AP1, Receiver address: FF:FF:FF:FF:FF:FF]. Address fields included in a DHCP IP packet may be set to [Source IP: IP address of DHCP server, Destination IP: 255.255.255.255]. Address fields of a DHCP payload may be set to [Your IP address: assigned IP address, Client MAC address: MAC address of STA MLD or MAC address of STA1]. The client MAC address may be set to the MAC address of the STA1 in charge of the first link on which the DHCP procedure is performed. The DHCP payload may include a subnet parameter, router IP address, domain name system (DNS) server IP address, IP lease time, and/or DHCP server ID.

The STA1 may receive the DHCP offer message, generate a DHCP request message based on the DHCP offer message, and transmit the DHCP request message to the DHCP server. Address fields included in a MAC frame header of the DHCP request message may be set to [Transmitter address: MAC address of STA1, Receiver address: FF:FF:FF:FF:FF:FF]. Address fields of a DHCP IP packet may be set to [Source IP: 0.0.0.0, Destination IP: 255.255.255.255]. Address fields of a DHCP payload may be set to [Requested IP address: requested IP address, Client MAC address: MAC address of STA MLD1 or MAC address of STA1]. The requested IP address may be set to one IP address selected from IP addresses included in the DHCP offer message. The client MAC address may be the MAC address of the STA1 supporting the first link on which the DHCP procedure is performed. The DHCP payload may further include the DHCP server ID.

The DHCP server may receive the DHCP request message from the STA1 and may transmit a DHCP ACK message for the DHCP request message to the STA1 through the AP1. The AP1 may receive the DHCP ACK message from the DHCP server and transmit the DHCP ACK message to the STA1. Address fields included in a MAC frame header of the DHCP ACK message transmitted by the AP1 may be set to [Transmitter address: MAC address of the AP1, Receiver address: FF:FF:FF:FF:FF:FF]. Address fields of a DHCP IP packet may be set to [source IP: IP address of the DHCP server, destination IP: 255.255.255.255]. Address fields of a DHCP payload may be set to [Your IP: assigned IP address, Client MAC address: MAC address of STA MLD or MAC address of STA1]. The client MAC address may be the MAC address of the STA in charge of the first link on which the DHCP procedure is performed. The DHCP payload may further include a subnet parameter, router IP address, DNS server IP address, IP lease time, and/or DHCP server ID.

The STA1 may receive the DHCP ACK message. The STA1 may perform communication using the IP address (e.g., determined IP address) during the IP lease time indicated by the DHCP ACK message. The AP1 may operate in a relay mode or proxy mode. In this case, the AP1 may operate identically or similarly to the above-described method. The DHCP procedure may be performed using the first link on which the STA1 and the AP1 operate. In this case, the client MAC address included in the DHCP payload may be set to the MAC address of the STA MLD or the MAC address of the STA1. When a message includes the MAC address of the STA MLD, a MAC frame header of the message may include the MAC address of the STA1, and a DHCP payload of the IP packet may include the MAC address of the STA MLD.

When the IP configuration procedure is completed, the communication node (e.g., the STA MLD or the STA1) may perform IP communication using the IP address. In order for the network (e.g., router) to forward a packet to the IP address of the STA1 (or the IP address of the STA MLD), an address resolution protocol (ARP) procedure, which is a mapping procedure between the IP address and the MAC address, may be performed. The communication node (e.g., router) of the network may broadcast an ARP request packet to obtain an address (e.g., MAC address) of a layer 2 entity mapped to a destination IP address of the IP packet (S402). The ARP request packet may include the destination IP address (e.g., the IP address of the STA MLD). The AP MLD (e.g., AP1 and/or AP2) may receive the ARP request packet from the communication node and broadcast the ARP request packet to acquire the MAC address of the STA MLD (or STA1 and/or STA2) having the IP address indicated by the ARP request packet (S403). In the communication system supporting a multi-link, the ARP operation may be performed according to various methods.

[ARP Operation Performing Method 1]

In the ARP operation performing method 1, an ARP operation may be performed independently for each link. For example, an ARP operation between the AP1 and the STA1 may be performed on the first link, and an ARP operation between the AP2 and the STA2 may be performed on the second link. The AP MLD may control APs (e.g., AP1 and/or AP2) in charge of the respective links to broadcast an ARP request packet (S403). In other words, the AP1 may broadcast the ARP request packet on the first link, and the AP2 may broadcast the ARP request packet on the second link. The STA1 may receive the ARP request packet from the AP1 on the first link and may transmit an ARP response packet as a response to the ARP request packet to the AP1 through the first link (S404). The AP1 may receive the ARP response packet from the STA1 on the first link. The STA2 may receive the ARP request packet from the AP2 on the second link and may transmit an ARP response packet as a response to the ARP request packet to the AP2 through the second link (S404). The AP2 may receive the ARP response packet from the STA2 on the second link.

FIG. 5A is a block diagram illustrating a first embodiment of a format of an ARP packet.

As shown in FIG. 5A, an ARP request packet and an ARP response packet may have the same format (e.g., format according to IPv4). If a value of an operation field included in a payload of an ARP packet is 1, the ARP packet may be an ARP request packet. If the value of the operation field included in the payload of the ARP packet is 2, the ARP packet may be an ARP response packet. Since each AP included in the AP MLD transmits the ARP request packet on each link, a sender hardware address included in a payload of the ARP request packet may be set to a 48-bit MAC address of the corresponding AP. Since each AP does not know a target hardware address, a target hardware address included in the payload of the ARP request packet may be set to 'FF:FF:FF:FF:FF:FF' (e.g., broadcast address).

A sender hardware address included in a payload of the ARP response packet may be set to a 48-bit MAC address of the corresponding STA. A target hardware address included in the payload of the ARP response packet may be set to the 48-bit MAC address of the AP which is a receiving target. Alternatively, the AP MLD MAC address instead of the AP MAC address may be included in the payload of the above-described ARP request or response packet, and the STA MLD MAC address instead of the STA MAC address may be included in the payload of the above-described ARP request or response packet.

Referring again to FIG. 4, when the AP MLD MAC address and/or the STA MLD MAC address are used, the STAs receiving the ARP request packet may transmit the corresponding ARP request packet to the STA MLD. A redundancy check may be performed on the ARP request packets, and then the corresponding ARP request packet may be transmitted to an entity capable of processing the ARP request packet (e.g., an entity included in the STA MLD). The aforementioned entity may process the ARP request packet, generate an ARP response packet, and transmit the generated ARP response packet to the STAs (e.g., STA1 and/or STA2). The STAs may transmit the ARP response packets to the APs (e.g., AP1 and/or AP2). The APs may receive the ARP response packets from the STAs and transmit the ARP response packets to the AP MLD. A redundancy check may be performed on the ARP response packets, and the AP MLD may transmit one ARP response packet to the network (e.g., communication node located in the network) (S405).

The STA MLD may control the ARP response packet to be transmitted through one link (e.g., one STA). In this case, since one ARP response packet is received, the AP MLD may not perform a redundancy check on the ARP response packet. In other words, the AP MLD may transmit the ARP response packet to the communication node without performing redundancy check. The communication node may receive the ARP response packet from the AP MLD and may identify the STA MLD MAC address and/or the STA MAC address included in the ARP response packet. The communication node may transmit data using the STA MLD MAC address and/or the STA MAC address (S406).

FIG. 5B is a block diagram illustrating a first embodiment of an Ethernet frame.

As shown in FIG. 5B, an Ethernet frame may include data, and a MAC destination field included in a MAC header of the Ethernet frame may be set to the STA MLD MAC address and/or the STA MAC address.

[ARP Operation Performing Method 2]

In the ARP operation performing method 2, the AP MLD may transmit an ARP request packet using some links (e.g., link(s) receivable by all STA MLDs or all STAs) among multiple links, and STA(s) receiving the ARP request packet may transmit an ARP response packet in response to the ARP request packet. Here, some APs among the APs included in the AP MLD may transmit the ARP request packets using some links. The AP MLD may select some links receivable by all STA MLDs or all STAs from among the multiple links.

For example, there may be a first link, a second link, and a third link, a STA MLD1 may use the first link and the second link, a STA MLD2 may use the second link and the third link, and a STA MLD3 may use the first link and the third link. When the AP MLD transmits the ARP request packet using the first link, only the STA MLD1 and the STA MLD3 may receive the ARP request packet. When the AP MLD transmits the ARP request packet using the second link, only the STA MLD1 and the STA MLD2 may receive the ARP request packet. When the AP MLD transmits the ARP request packet using the third link, only the STA MLD2 and the STA MLD3 may receive the ARP request packet. Accordingly, the AP MLD may transmit the ARP request packet using the first link and second link or using the second link and the third link, so that all the STA MLDs receive the ARP request packet.

The STA MLD may receive the ARP request packet from the AP MLD and may transmit an ARP response packet to the AP MLD in response to the ARP request packet. Even when the ARP request packet is received through a plurality of links, the STA MLD may transmit the ARP response packet to the AP MLD using at least one link among the plurality of links. A sender/target hardware address of the ARP request/response packet may be set to the MLD MAC address (e.g., AP MLD MAC address, STA MLD MAC address).

Figure 6:
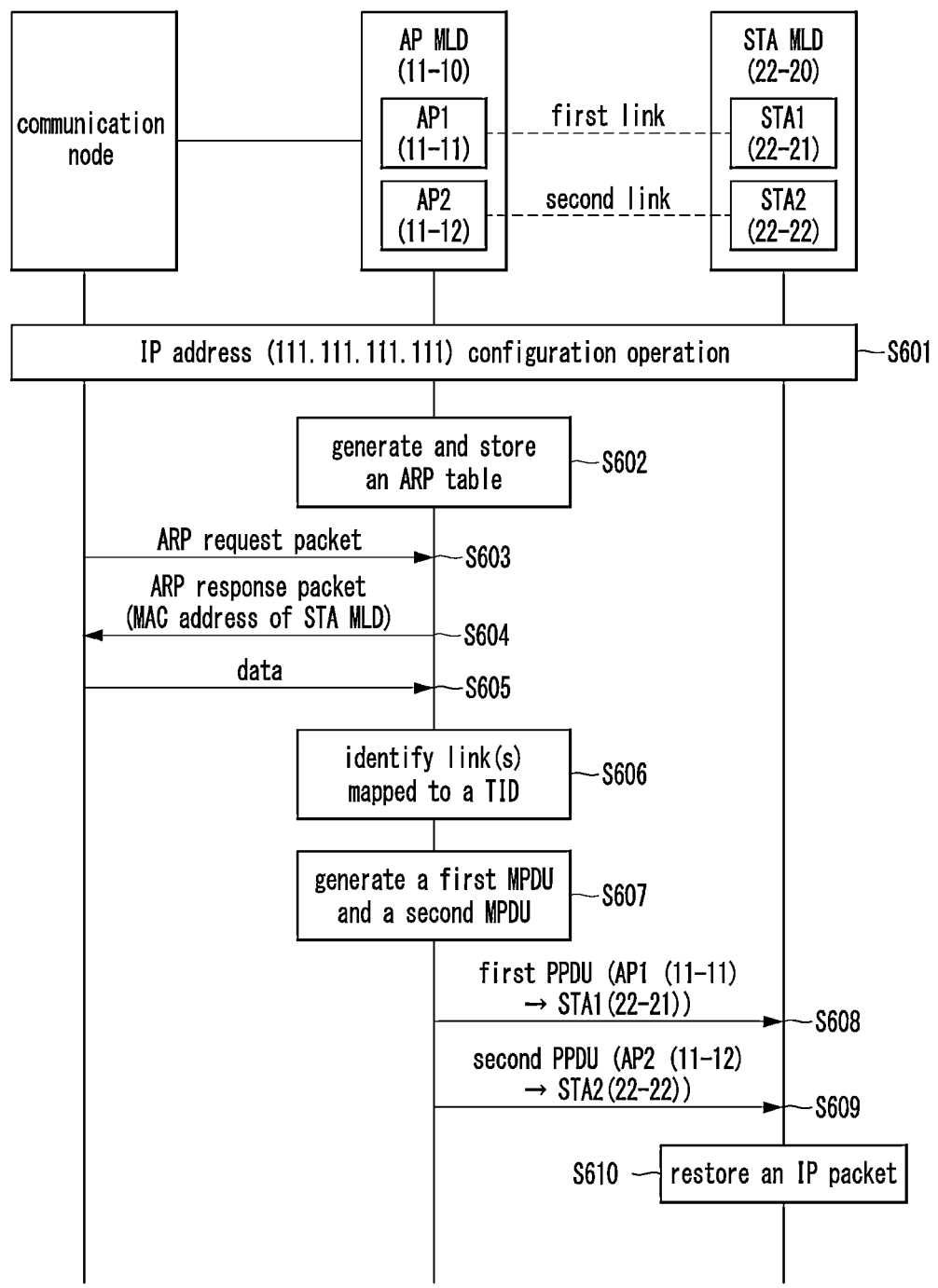
FIG. 6 is a sequence chart illustrating a second embodiment of a method for transmitting and receiving data according to an ARP operation in a wireless LAN system.

FIG. 6 is a sequence chart illustrating a second embodiment of a method for transmitting and receiving data according to an ARP operation in a wireless LAN system.

As shown in FIG. 6, each of the AP MLD and STA MLD may support two links (e.g., a first link and a second link). The AP1 included in the AP MLD may be in charge of the first link, and the AP2 included in the AP MLD may be in charge of the second link. The STA1 included in the STA MLD may be in charge of the first link, and the STA2 included in the STA MLD may be in charge of the second link. The STA MLD may perform an IP address configuration operation (e.g., DHCP procedure) with a DHCP server (e.g., communication node) via the AP MLD (S601). The IP address configuration procedure may be performed using one link among the multiple links (e.g., the first link and the second link). The AP MLD may perform a role of a DHCP server, DHCP proxy, or DHCP relay.

The AP MLD may generate and/or store an ARP table (e.g., address table) including IP addresses (e.g., Your IP address) and MAC addresses (e.g., client MAC address) (S602). The IP addresses and/or MAC addresses may be identified in the DHCP procedure (e.g., step S601). Information on a mapping relationship between the IP addresses and the MAC addresses may be included in the ARP table. The MAC addresses in the ARP table may include the STA MLD MAC addresses and the STA MAC addresses. In the ARP table, the STA MAC address(es) may depend on the STA MLD MAC address. For example, the MAC address of the STA MLD may be mapped with the MAC address(es) of the STA(s) affiliated with the STA MLD. The ARP table generated by the AP MLD may be as shown in Table 1 below.

TABLE 1

| ARP table | | |
|---|---|---|
| IP address | MAC address | Entity |
| 111.111.111.111 | 22-20 | STA MLD |
| 111.111.111.111 | 22-21 | STA1 |
| 111.111.111.111 | 22-22 | STA2 |

The AP MLD may identify the STA MLD using the ARP table. When the client MAC address included in the DHCP message is the STA MLD MAC address, the AP MLD may identify the STA MLD based on the STA MLD MAC address. When the client MAC address included in the DHCP message is the STA MAC address, the AP MLD may identify the STA MLD mapped to the STA MAC address and may generate the ARP table (e.g., binding table or address table) including information on the mapping relationship of 'IP address-STA MLD MAC address-STA MAC address'.

Referring to the ARP table defined in Table 1, the MAC address of the STA MLD may be 22-20, the MAC address of the STA1 affiliated with the STA MLD may be 22-21, and the MAC address of the STA2 affiliated with the STA MLD may be 22-22. The MAC address of the STA1 and the MAC address of the STA2 may depend on the MAC address of the STA MLD. The STA MLD and the STA(s) affiliated with the STA MLD may have the same IP address (i.e., 111.111.111.111). The same IP address may be mapped to the MAC address of the STA MLD, the MAC address of the STA1, and the MAC address of the STA2.

Meanwhile, the communication node may transmit, to the AP MLD, an ARP request packet requesting a layer 2 address (e.g., MAC address) mapped to 111.111.111.111 to perform communication with other communication nodes (e.g., STA MLD, STA1, and/or STA2) having the IP address set to 111.111.111.111 (S603). For example, if there is a data unit to be transmitted to the STA1 and the STA2 included in the STA MLD, the communication node may transmit, to the AP MLD, an ARP request packet requesting the MAC address (e.g., representative MAC address) of the STA MLD with which the STA1 and the STA2 are affiliated. The ARP request packet may be transmitted to request the MAC address of the STA MLD instead of the MAC addresses of the STA1 and the STA2 even when the STA MLD, STA1, and STA2 have different MAC addresses. The ARP request packet may include an indicator requesting provision of the MAC address (e.g., representative MAC address) of the STA MLD among the STA MLD, STA1, and STA2 having the same IP address.

The AP MLD may receive the ARP request packet from the communication node and may identify that transmission of the MAC address mapped to 111.111.111.111 is requested based on information included in the ARP request packet. In this case, the AP MLD may identify the MAC addresses (e.g., 22-20, 22-21, and 22-22) mapped to 111.111.111.111 from the ARP table. The AP MLD may generate an ARP response packet including at least one of the MAC address of the STA MLD, the MAC address of the STA1, or the MAC address of the STA2 on behalf of the STA MLD. The AP MLD may transmit the ARP response packet to the communication node (S604). The ARP response packet may include a MAC address of a representative communication node (e.g., a representative MAC address of the communication node) among the communication nodes (e.g., STA MLD, STA1, and STA2) having the same IP address. The representative communication node may be the MLD (i.e., STA MLD). The AP MLD may not transmit the ARP request packet received from the communication node to the STA MLD and may generate and transmit an ARP response packet to the communication node on behalf of the STA MLD. In the case that the ARP response packet is transmitted by the AP MLD on behalf of the STA MLD, the AP MLD may not need to broadcast the ARP request packet using all links. Accordingly, radio resources can be saved. The procedure for the AP MLD to transmit the ARP response packet on behalf of the STA MLD may be referred to as a proxy ARP procedure.

Meanwhile, the communication node may receive the ARP response packet from the AP MLD and may identify at least one of the MAC address of the STA MLD, the MAC address of the STA1, or the MAC address of the STA2 included in the ARP response packet. The ARP response packet may include the MAC address of the representative communication node (e.g., STA MLD) among the communication nodes (e.g., STA MLD, STA1, and STA2) having the same IP address (e.g., 111.111.111.111). The communication node may transmit data for the STA MLD using the identified address (S605). For example, when data (e.g., IP packet) to be transmitted to the STA MLD (e.g., the STA MLD having the IP address of 111.111.111.111) exists in the communication node, the communication node may generate a data frame (e.g., Ethernet frame) included the data. The data (e.g., IP packet) may be included in a payload of the data frame. A receiver address of the data frame may be set to the STA MLD MAC address. The data frame may include a traffic identifier (TID) for the data. The TID may be determined according to the type of the data.

The AP MLD may receive the data frame from the communication node. The AP MLD may identify a receiver address (e.g., STA MLD MAC address) and/or the type of the data based on information included in the data frame. The AP MLD may identify link(s) mapped to the TID based on 'TID-link mapping information' (S606). For example, the AP MLD may identify the TID for the data included in the data frame, identify link(s) associated with the TID (e.g., link(s) on which the data is to be transmitted) based on the TID-link mapping information, and determine communication node(s) (e.g., STA1 and STA2) operating on the link(s) as final destination(s). Even when the MAC address of the final destination of the corresponding data is not included in the data frame received from the communication node, the AP MLD may identify the final destination to which the data is to be transmitted based on the TID-link mapping information. When the final destinations are the STA1 and the STA2, the AP MLD may generate a data unit to be transmitted to the STA1 and the STA2. Here, the TID for the data frame may be mapped to the first link and the second link. Accordingly, the AP MLD may transmit the data to the STA MLD using both the first link and the second link.

To use both the first link and the second link, the AP MLD may generate two MAC protocol data units (MPDUs) based on the data received from the communication node (S607). A receiver address of the first MPDU of the two MPDUs may be set to the MAC address of the STA1 (e.g., 22-21), and a receiver address of the second MPDU of the two MPDUs may be set to the MAC address of the STA2 (e.g., 22-22). The data of the STA MLD received from the communication node may be mapped to the STA1 and the STA2. The first MPDU and the second MPDU may include the same data. Alternatively, the first MPDU and the second MPDU may include different data.

The AP MLD may deliver the same data to the AP1 and the AP2. Alternatively, the AP MLD may divide the data received from the communication node into two data units (e.g., a first data unit and a second data unit). For example, a payload of the Ethernet frame received from the communication node may be divided into the first data unit and the second data unit. The AP MLD may transmit a first Ethernet frame including the first data unit to the AP1 and may transmit a second Ethernet frame including the second data unit to the AP2. A MAC header of each of the first Ethernet frame and the second Ethernet frame may be configured identically to a MAC header of the Ethernet frame received from the communication node. A receiver address of the first Ethernet frame received by the AP1 from the AP MLD may be the STA MLD MAC address, and a receiver address of the second Ethernet frame received by the AP2 from the AP MLD may be the STA MLD MAC address. In other words, the receiver address of the first Ethernet frame may be the same as the receiver address of the second Ethernet frame. The AP1 may generate the first MPDU having, as a receiver address, the MAC address of the STA1 mapped to the STA MLD MAC address, which is the receiver address of the first Ethernet frame received from the AP MLD. The AP1 may transmit a first PPDU including the first MPDU using the first link. The AP2 may generate a second MPDU having, as a receiver address, the MAC address of the STA2 mapped to the STA MLD MAC address, which is the receiver address of the second Ethernet frame received from the AP MLD. The AP2 may transmit a second PPDU including the second MPDU using the second link. When delivering the data (e.g., the first data unit) to the AP1, the AP MLD may change the receiver address from the STA MLD MAC address to the MAC address of the STA1 operating on the first link. When delivering the data (e.g., the second data unit) to the AP2, the AP MLD may change the receiver address from the STA MLD MAC address to the MAC address of the STA2 operating on the second link. The AP1 may generate the first MPDU by using information included in the MAC header of the Ethernet frame (e.g., the first Ethernet frame) received from the AP MLD as it is. The AP2 may generate the second MPDU by using information included in the MAC header of the Ethernet frame (e.g., the second Ethernet frame) received from the AP MLD as it is.

The TID of the data received from the communication node may be mapped to one link (e.g., the first link). The AP MLD may identify the TID of the data received from the communication node and may deliver the corresponding data to the AP1 to deliver the data to the first link mapped to the identified TID. The AP1 may receive the data from the AP MLD, generate a first MPDU including the data, and transmit the generated first MPDU to the STA1. A receiver address of the first MPDU may be set to the MAC address of the STA1.

When the size of the data received from the communication node is S and the number of links available for transmission of the data is L, the size of data included in a data unit (e.g., MPDU, physical layer convergence protocol (PLCP) protocol data unit (PPDU)) transmitted on each link may be S/L. In other words, the size of the data transmitted on each link may be the same. Alternatively, the size of data transmitted on each link may be determined according to an occupancy state (e.g., occupancy rate) of the corresponding link. For example, the size of data transmitted on a link having a high occupancy rate may be smaller than that of data transmitted on a link having a low occupancy rate.

The AP1 of the AP MLD may transmit the first PPDU including the first MPDU to the STA1 using the first link (S608). A transmitter address of the first PPDU may be set to the MAC address of the AP1 (e.g., 11-11), and a receiver address of the first PPDU may be set to the MAC address of the STA1 (e.g., 22-21). The STA1 of the STA MLD may receive the first PPDU from the AP1 on the first link. The AP2 of the AP MLD may transmit the second PPDU including the second MPDU to the STA2 using the second link (S609). A transmitter address of the second PPDU may be set to the MAC address of the AP2 (e.g., 11-12), and a receiver address of the second PPDU may be set to the MAC address of the STA2 (e.g., 22-22). The STA2 of the STA MLD may receive the second PPDU from the AP2 on the second link.

The first MPDU may be delivered from the STA1 to the STA MLD, and the second MPDU may be delivered from the STA2 to the STA MLD. The STA MLD may restore an IP packet by assembling the data included in the first MPDU and the data included in the second MPDU (S610). An IP address of the IP packet may be the IP address of the STA MLD.

Figure 7A:
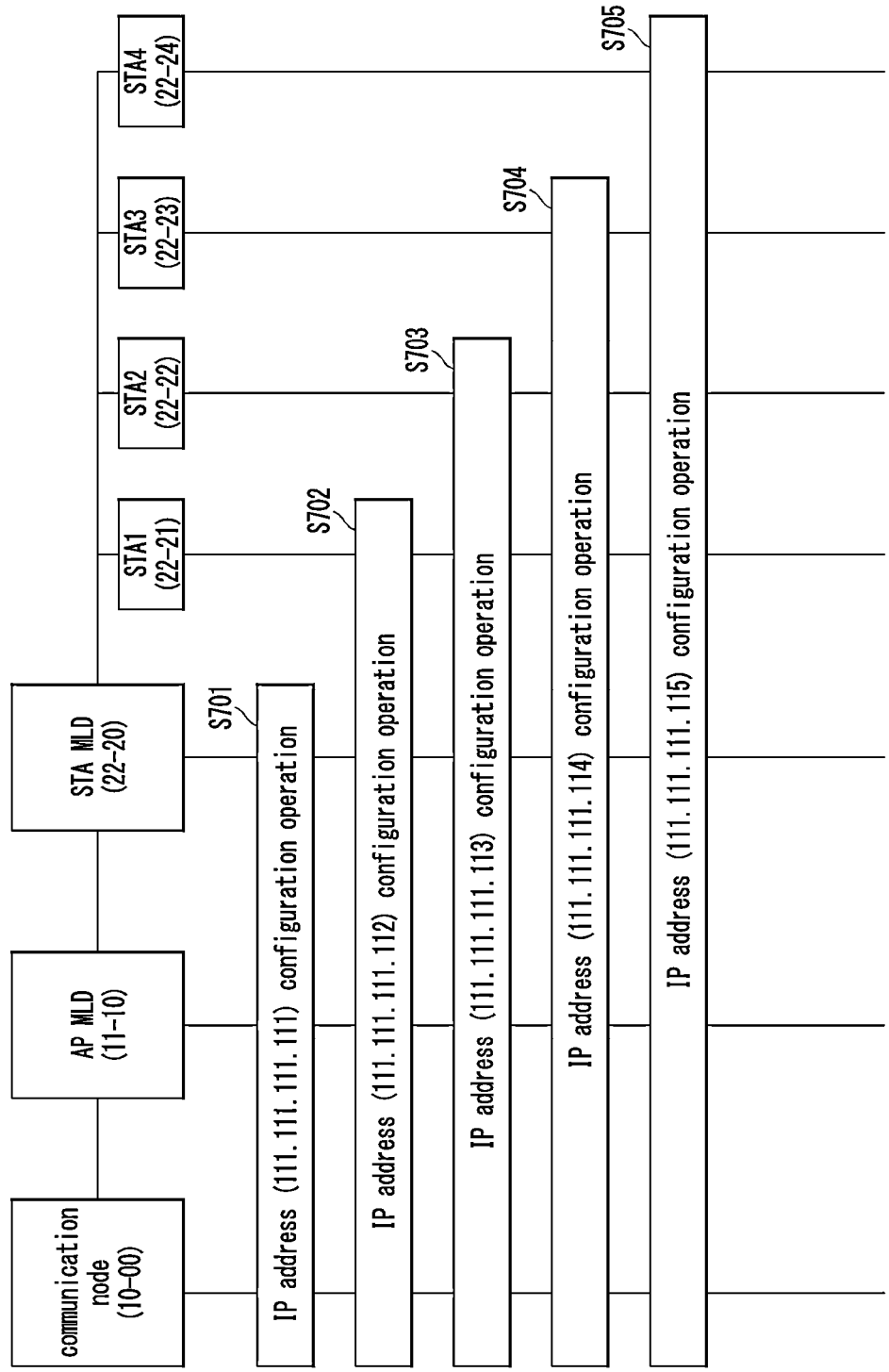
FIGS. 7A and 7B are sequence charts illustrating a third embodiment of a method for transmitting and receiving data according to an ARP operation in a wireless LAN system.
Figure 7B:
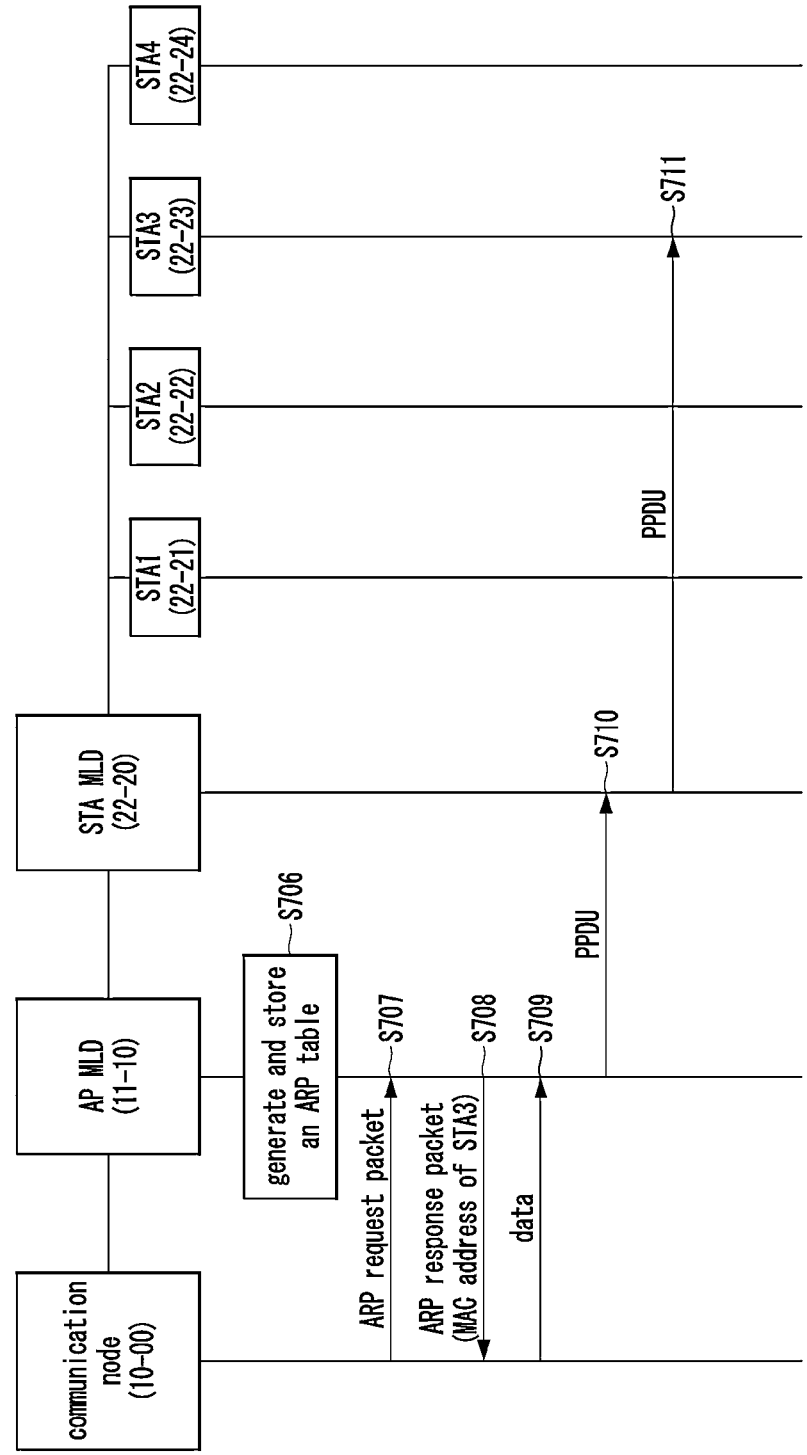

FIGS. 7A and 7B are sequence charts illustrating a third embodiment of a method for transmitting and receiving data according to an ARP operation in a wireless LAN system.

As shown in FIGS. 7A and 7B, the STA MLD may perform a soft AP function. The STA MLD may be associated with a plurality of STAs (e.g., STA1, STA2, STA3, and STA4). In other words, the STA MLD may serve as an AP. Each of the STA MLD and the plurality of STAs may perform an operation of configuring (e.g., acquiring) an IP address with a DHCP server (e.g., communication node). For example, the STA MLD may perform an IP address configuration operation with the DHCP server (S701). According to step S701, the IP address of the STA MLD may be set to 111.111.111.111. The STA1 may perform an IP address configuration operation with the DHCP server (S702). According to step S702, the IP address of the STA1 may be set to 111.111.111.112. The STA2 may perform an IP address configuration operation with the DHCP server (S703). According to step S703, the IP address of the STA2 may be set to 111.111.111.113. The STA3 may perform an IP address configuration operation with the DHCP server (S704). According to step S704, the IP address of the STA3 may be set to 111.111.111.114. The STA4 may perform an IP address configuration operation with the DHCP server (S705). According to step S705, the IP address of the STA4 may be set to 111.111.111.115.

The AP MLD may monitor the IP address configuration operations. For example, the AP MLD may identify the IP address of the STA MLD and/or the IP addresses of the STAs based on information included in messages (e.g., DHCP messages, DHCP packets) transmitted and received in the IP address configuration operations. The AP MLD may map the IP addresses to MAC addresses and may generate and/or store an ARP table including information on a mapping relationship between the IP addresses and the MAC addresses (S706). The ARP table (e.g., binding table, address table) may be configured as shown in Table 2 below.

TABLE 2

ARP table

| IP address | MAC address | Via | Entity |
|---|---|---|---|
| 111.111.111.111 | 22-20 | 22-20 | STA MLD |
| 111.111.111.112 | 22-21 | 22-20 | STA1 |
| 111.111.111.113 | 22-22 | 22-20 | STA2 |
| 111.111.111.114 | 22-23 | 22-20 | STA3 |
| 111.111.111.115 | 22-24 | 22-20 | STA4 |

Since the STAs are associated with the soft AP (e.g., STA MLD), Table 2 may further include a Via field. In Table 2, the Via field may be set to the MAC address of the soft AP with which the STAs are associated. Since there is no upper entity connected to the STA MLD, the Via field of the STA MLD may be set to the MAC address of the STA MLD. Similarly, the ARP table defined in Table 1 may further include a Via field.

Meanwhile, the communication node may transmit an ARP request packet requesting a layer 2 address (e.g., MAC address) mapped to 111.111.111.114 to the AP MLD to perform communication with the STA3 having the IP address set to 111.111.111.114 (S707). The AP MLD may receive the ARP request packet from the communication node and may identify that transmission of the MAC address mapped to 111.111.111.114 is requested based on information included in the ARP request packet. In this case, the AP MLD may identify, from the ARP table, the MAC address (e.g., 22-23) mapped to 111.111.111.114 and the MAC address (e.g., 22-20) of the soft AP with which the STA3 having the IP address set to 111.111.111.114 is associated. The AP MLD may generate an ARP response packet including the identified MAC address (e.g., 22-23) of the STA3 on behalf of the STA3. In other words, the ARP response packet may include the MAC address of the STA3. Alternatively, the AP MLD may generate an ARP response packet including the MAC address (e.g., 22-20) of the soft AP with which the identified STA3 is associated on behalf the STA MLD. In other words, the ARP response packet may include the MAC address of the STA MLD. The AP MLD may transmit the ARP response packet to the communication node (S708). The AP MLD may not transmit the ARP request packet received from the communication node to the STA MLD and/or STA(s) and may transmit the ARP response packet to the communication node on behalf of the STA MLD and/or STA(s).

The communication node may receive the ARP response packet from the AP MLD and may identify the MAC address of the STA3 or the MAC address of the STA MLD included in the ARP response packet. The communication node may transmit data for the STA3 by using the identified MAC address (S709). For example, when data (e.g., IP packet) to be transmitted to the STA3 (e.g., STA3 having the IP address of 111.111.111.114) exists in the communication node, the communication node may generate a data frame (e.g., Ethernet frame) including the data. The data (e.g., IP packet) may be included in a payload of the data frame. A receiver address of the data frame may be set to the MAC address (e.g., 22-23) of the STA3 or the MAC address of the STA MLD.

The AP MLD may receive the data frame from the communication node and identify that the receiver address of the data frame is the MAC address (e.g., 22-23) of the STA3 or the MAC address (e.g., 22-20) of the STA MLD. The AP MLD may transmit the data to the STA MLD when a receiver address of the corresponding data frame is the MAC address (e.g., 22-20) of the STA MLD. The AP MLD may transmit the data to the STA MLD (e.g., soft AP) by referring to the ARP table in order to transmit the data to the STA3 when the receiver address of the corresponding data frame is the MAC address (e.g., 22-23) of the STA3. In this case, the data may be transmitted to the STA3 via the STA MLD. For example, the AP MLD may generate an MPDU including the data and may transmit a PPDU generated based on the MPDU to the STA MLD (S710). The MPDU transmitted in step S710 may be configured as shown in FIG. 8 below.

Figure 8:
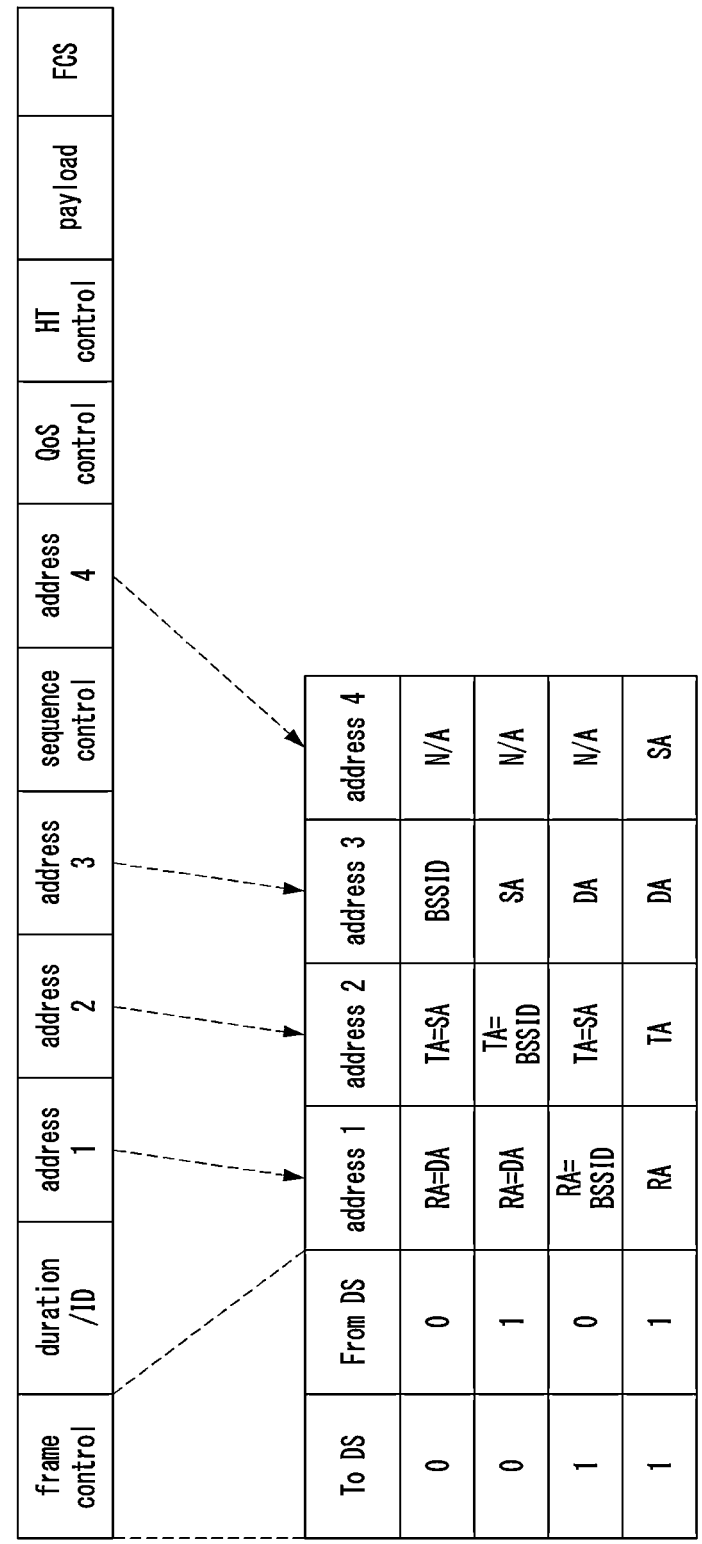
FIG. 8 is a block diagram illustrating a first embodiment of an MPDU.

FIG. 8 is a block diagram illustrating a first embodiment of an MPDU.

As shown in FIG. 8, a frame control field may include a 'To DS' field and a 'From DS' field. In the MPDU transmitted in step S710 of FIG. 7B, the 'To DS' field may be set to 1 and the 'From DS' field may be set to 1. When the 'To DS' field is set to 1 and the 'From DS' field is set to 1, address fields of the MPDU (e.g., PPDU) may be set as shown in Table 3 below.

TABLE 3

| Address 1 | Address 2 | Address 3 | Address 4 |
|---|---|---|---|
| RA | TA | DA | SA |

The RA may refer to a receiver address (e.g., receiver address in communication according to the IEEE 802.11), the TA may refer to a transmitter address (e.g., transmitter address in communication according to the IEEE 802.11), the DA may refer to a final destination address, the SA may refer to an original sender address, and the BSSID may refer to an L2 ID of a basic service set (BSS).

Referring again to FIGS. 7A and 7B, if the receiver address of the data frame is the MAC address (e.g., 22-23) of the STA3 in step S710, the data may be transmitted to the STA3 via the STA MLD (e.g., soft AP). In this case, the Address 1 field of the MPDU may be set to 22-20 (e.g., the MAC address of the STA MLD), the Address 2 field of the MPDU may be set to 11-10 (e.g., the MAC address of the AP MLD), the Address 3 field of the MPDU may be set to 22-23 (e.g., the MAC address of the STA3), and the Address 4 field of the MPDU may be set to 10-00 (e.g., the MAC address of the communication node). When multiple links are used, the MAC address of the STA in charge of the link of the soft AP may be set to the Address field 1, and the MAC address of the AP in charge of the corresponding link may be set to the Address field 2. When the receiver address of the data frame is the MAC address (e.g., 22-20) of the STA MLD in step S710, the data may be transmitted to the STA MLD (e.g., soft AP). In this case, the Address 3 field of the MPDU may also be set to the MAC address (e.g., 22-20) of the STA MLD.

The STA MLD may receive the PPDU from the AP MLD, identify the MPDU included in the PPDU, and generate an MPDU to be transmitted to the STA3 based on the identified MPDU (e.g., Address 3 field). When the receiver address of the PPDU received from the AP MLD (e.g., Address 1 field and Address 3 field) is the STA MLD, the STA MLD may generate an MPDU to be delivered to the STA3 by referring to a receiver IP address (e.g., 111.111.111.114) included in a payload. The STA MLD may generate a PPDU based on the generated MPDU and transmit the PPDU to the STA3 (S711). The STA3 may receive the PPDU from the STA MLD, identify the MPDU included in the PPDU, and obtain the data from the MPDU. In step S711, the structure of the MAC header of the MPDU may be the same as the structure of the MAC header transmitted from the AP to the STA. In the MPDU transmitted in step S711, the 'To DS' field may be set to 0 and the 'From DS' field may be set to 1. When the 'To DS' field is set to 0 and the 'From DS' field is set to 1, the address fields of the MPDU (e.g., PPDU) may be set as shown in Table 4 below.

TABLE 4

| Address 1 | Address 2 | Address 3 | Address 4 |
|---|---|---|---|
| DA | BSSID | SA | N/A |

The Address 1 field of the MPDU may be set to 22-23 (e.g., the MAC address of the STA3), the Address 2 field of the MPDU may be set to 22-20 (e.g., the MAC address of the soft AP (e.g., STA MLD)), and the Address 3 field thereof may be set to 11-10 (e.g., the address of the AP MLD).

The embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those having ordinary skill in the art.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above hardware device can be configured to operate as at least one software module in order to perform the embodiments of the present disclosure, and vice versa.

While the embodiments of the present disclosure and their advantages have been described in detail, it should be understood that various changes, substitutions, and alterations may be made herein without departing from the scope of the present disclosure.

What is claimed is:

1. An operation method of a first device in a communication system, the operation method comprising:
   receiving, from a communication node, an address resolution protocol (ARP) request packet requesting transmission of a medium access control (MAC) address of a second device associated with the first device;
   identifying a representative MAC address of the second device, which is requested by the ARP request packet, from an ARP table stored in the first device;
   transmitting, to the communication node, an ARP response packet including the representative MAC address;
   transmitting a first protocol data unit (PDU) to a station1 (STA1) included in the second device; and
   transmitting a second PDU to a STA2 included in the second device,
   wherein a size of the first PDU and a size of the second PDU are determined based on link characteristics.

2. The operation method according to claim 1, wherein the first device is an access point (AP) multi-link device (MLD),
   wherein the second device is a STA MLD,
   wherein the STA MLD includes the STA1 and the STA2,
   wherein a first MAC address of the STA MLD, a second MAC address of the STA1, and a third MAC address of the STA2 are configured independently of each other, and
   wherein the representative MAC address is the first MAC address.

3. The operation method according to claim 1, wherein the ARP request packet includes an indicator requesting provision of the representative MAC address.

4. The operation method according to claim 1, further comprising:
receiving a data frame from the communication node,
wherein, in response to that a receiver address of the data frame is set to the representative MAC address of the second device, the first PDU and the second PDU are generated based on data included in the data frame.

5. The operation method according to claim 1, further comprising:
determining a traffic identifier (TID) based on a type of the data; and
identifying a first link and a second link mapped to the TID among multiple links,
wherein the first PDU is transmitted to the STA1 through the first link, and the second PDU is transmitted to the STA2 through the second link.

6. The operation method according to claim 1, wherein the link characteristics are link occupancy states.

7. The operation method according to claim 1, wherein the ARP request packet includes an Internet protocol (IP) address of the second device, the ARP request packet is not transmitted to the second device, and the ARP response packet is transmitted by the first device on behalf of the second device.

8. The operation method according to claim 1, wherein the ARP table includes an IP address and a MAC address of the second device associated with the first device and a MAC address of each of one or more STAs included in the second device.

9. The operation method according to claim 1, wherein the ARP table is generated based on information included in messages transmitted and received in an IP address acquisition procedure performed by the second device.

10. The operation method according to claim 1, wherein the first device is an AP MLD, the second device is a STA MLD, and the first device is associated with the second device through multiple links.

11. A first device in a communication system, comprising:
a processor; and
a memory storing one or more instructions executable by the processor,
wherein the one or more instructions are executed to perform:
receiving, from a communication node, an address resolution protocol (ARP) request packet requesting transmission of a medium access control (MAC) address of a station 1 (STA1) included in a second device associated with the first device;
identifying a MAC address of the STA1, which is requested by the ARP request packet, from an ARP table stored in the first device;
transmitting, to the communication node, an ARP response packet including the MAC address of the STA1;
transmitting a first protocol data unit (PDU) to the STA1 included in the second device; and
transmitting a second PDU to a STA2 included in the second device,
wherein a size of the first PDU and a size of the second PDU are determined based on link characteristics.

12. The first device according to claim 11, wherein the ARP request packet includes an Internet protocol (IP) address of the STA1, the ARP request packet is not transmitted to the second device or the STA1, and the ARP response packet is transmitted by the first device on behalf of the second device or the STA1.

13. The first device according to claim 11, wherein the second device includes one or more STAs, and an IP address of each of the second device and the one or more STAs are configured independently.

14. The first device according to claim 11, wherein the ARP table includes an IP address and a MAC address of the second device associated with the first device and an IP address and a MAC address of each of one or more STAs included in the second device.

15. The first device according to claim 14, wherein the ARP table is generated based on information included in messages transmitted and received in an IP address acquisition procedure performed by each of the second device and the one or more STAs.

16. The first device according to claim 11, wherein the one or more instructions are further executed to perform:
receiving a data frame from the communication node,
wherein, in response to that a receiver address of the data frame is set to the MAC address of the STA1 included in the second device, the first PDU and the second PDU are generated based on data included in the data frame, and
wherein an address 1 field included in the first PDU is set to a MAC address of a STA multi-link device (MLD), which is the second device, an address 2 field included in the first PDU is set to a MAC address of an AP MLD, which is the first device, an address field 3 included in the first PDU is set to the MAC address of the STA1, and an address 4 field included in the first PDU is set to a MAC address of the communication node.

* * * * *